G. W. BINGHAM.
MOVING PICTURE MACHINE.
APPLICATION FILED OCT. 25, 1909.
971,588.
Patented Oct. 4, 1910.
4 SHEETS—SHEET 4.
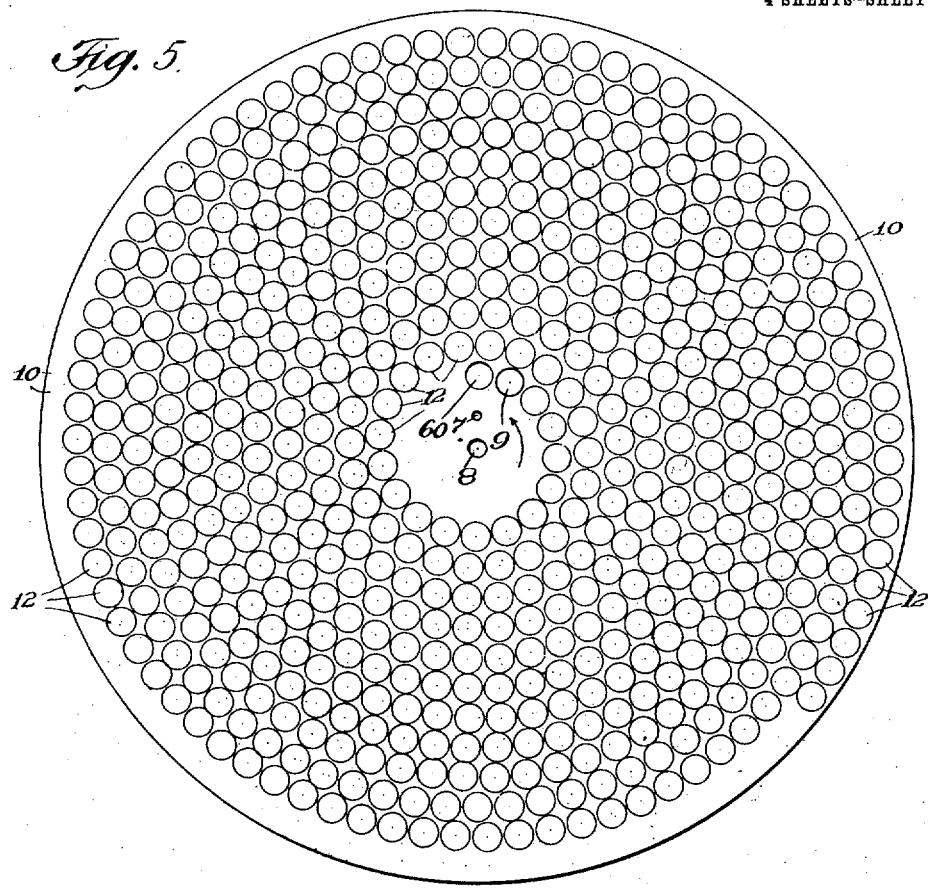
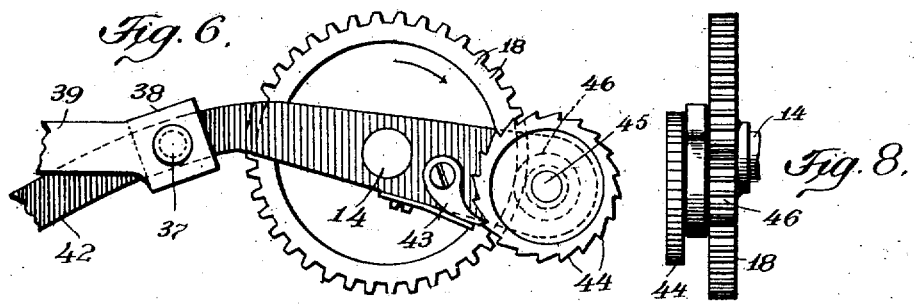
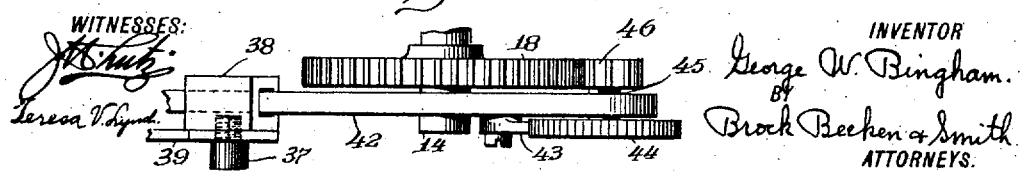
WITNESSES:
INVENTOR
George W. Bingham.
BY
Brock Becken & Smith
ATTORNEYS.
THE NORRIS PETERS CO., WASHINGTON, D. C.

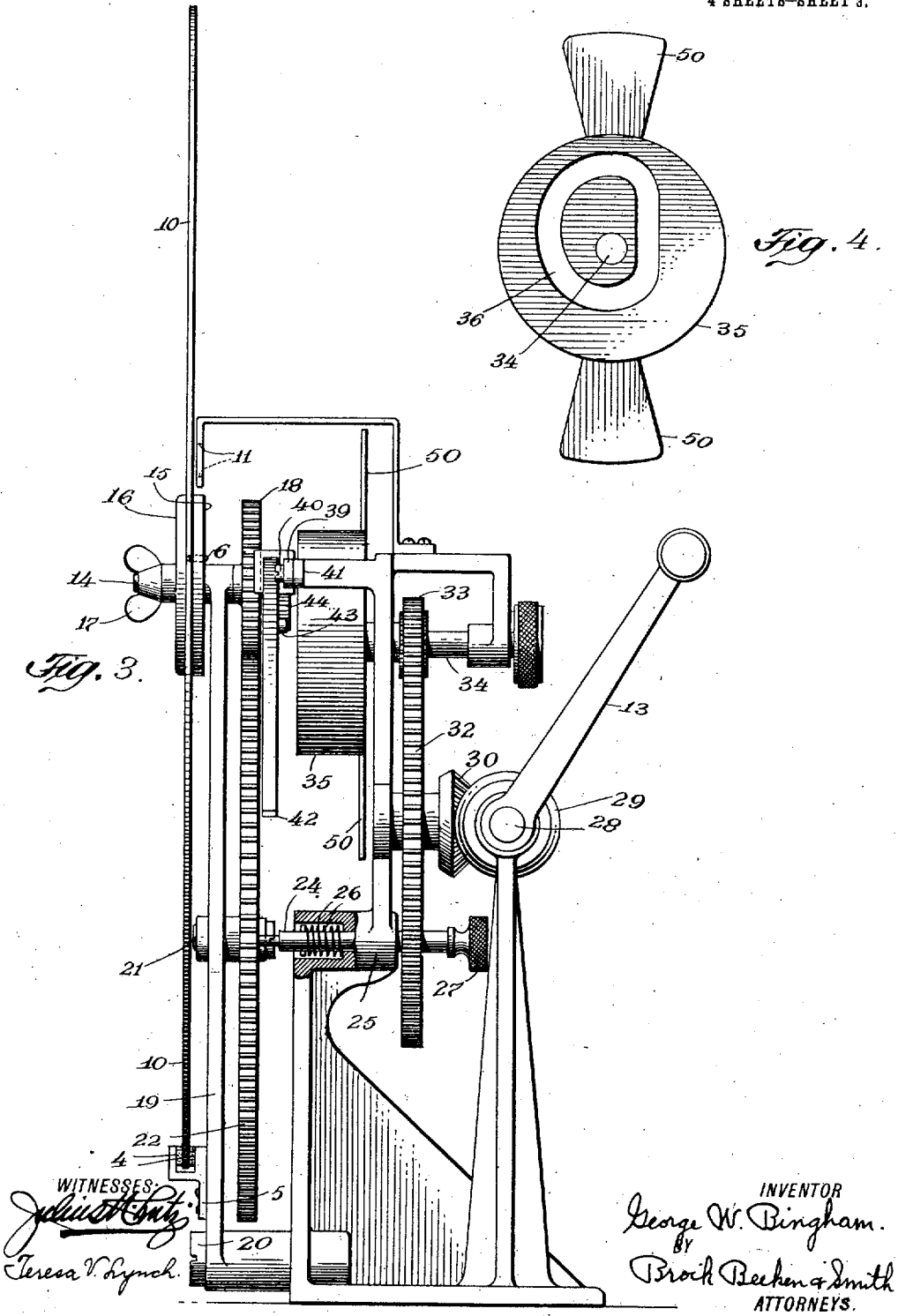

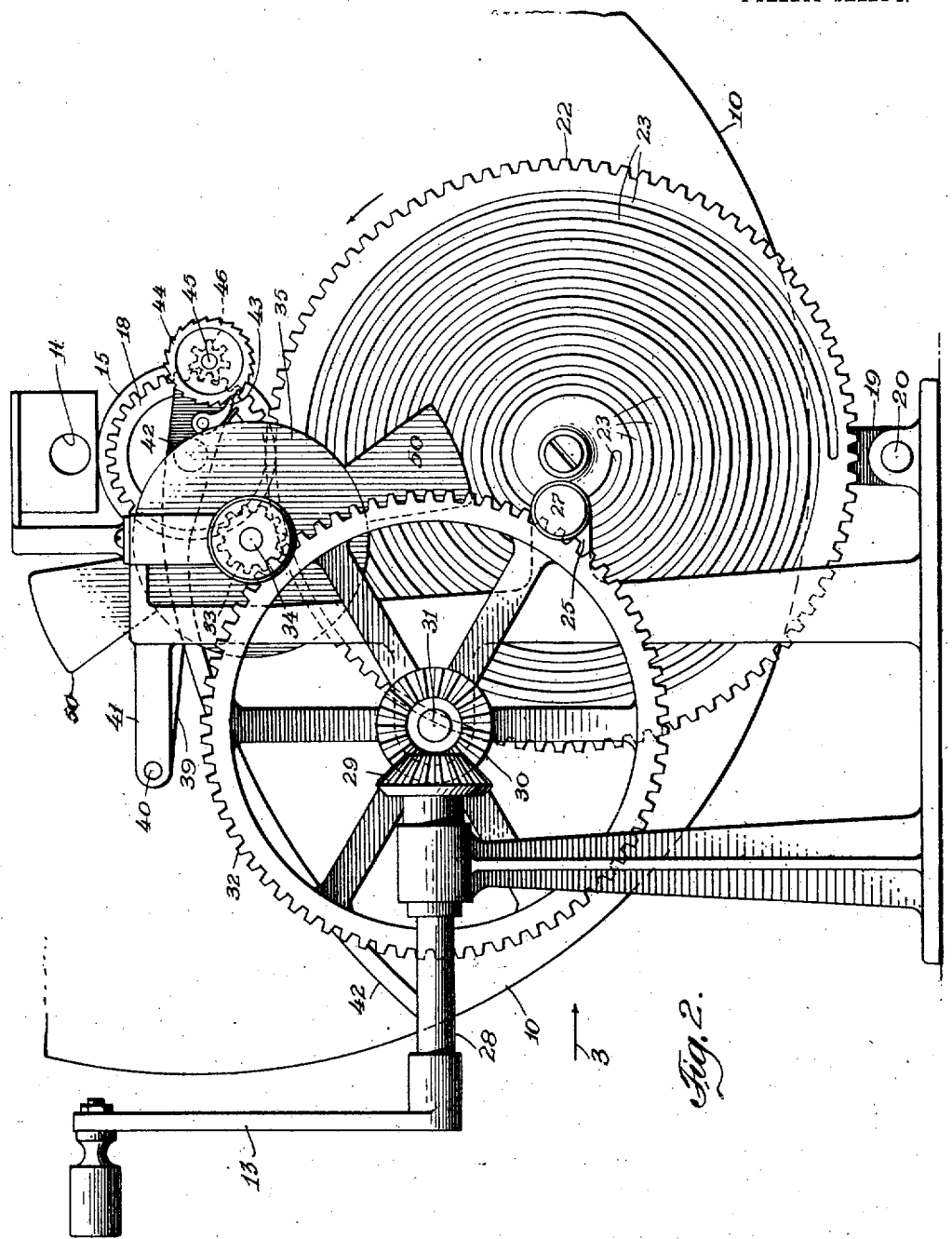

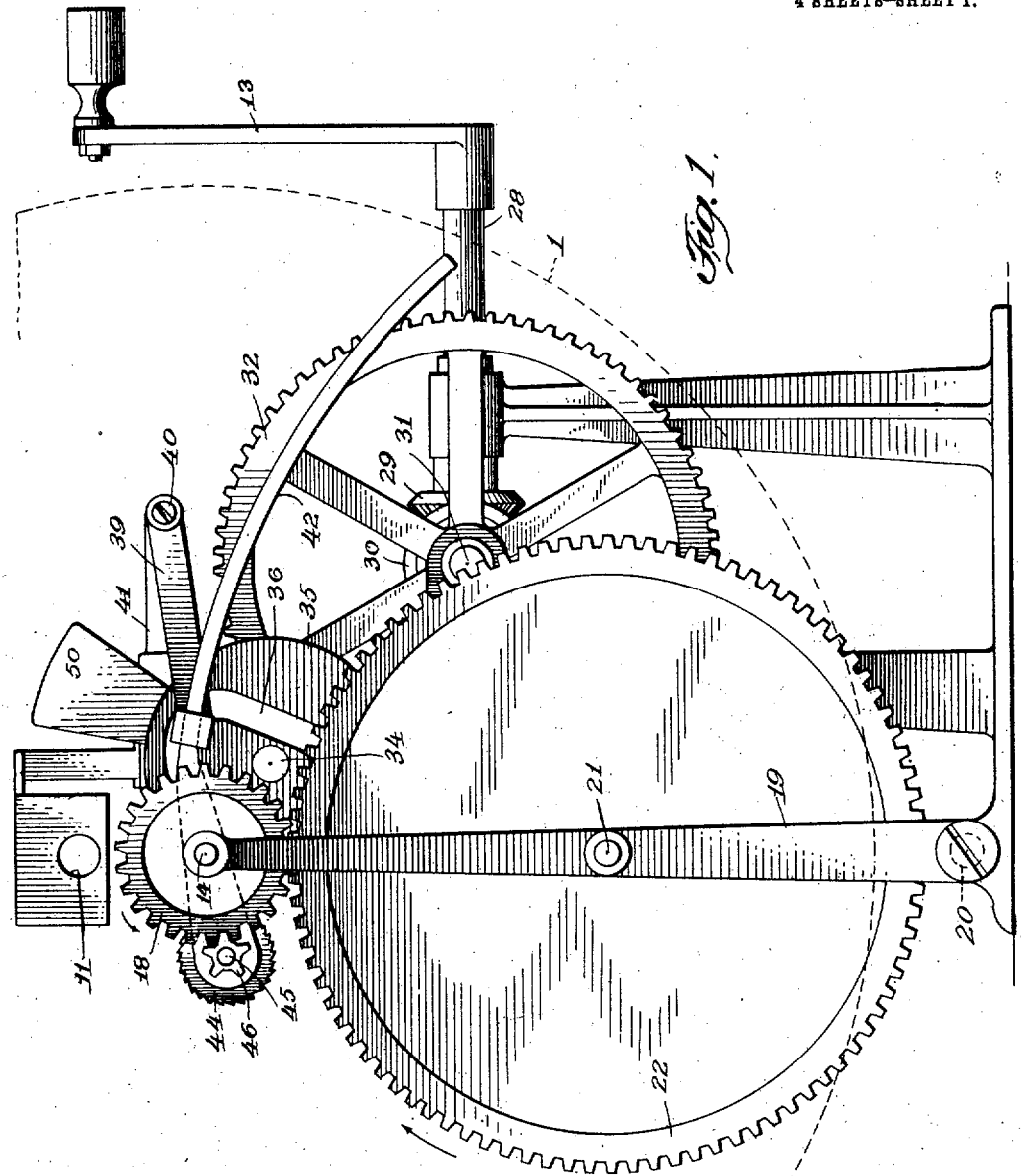

UNITED STATES PATENT OFFICE.

GEORGE W. BINGHAM, OF BROOKLYN, NEW YORK, ASSIGNOR TO BINGHAM-CAMERON COMPANY, A CORPORATION OF NEW YORK.

MOVING-PICTURE MACHINE.

971,588.     Specification of Letters Patent.     Patented Oct. 4, 1910.

Application filed October 25, 1909. Serial No. 524,366.

*To all whom it may concern:*

Be it known that I, GEORGE W. BINGHAM, a citizen of the United States, and a resident of the borough of Brooklyn, in the county of Kings and State of New York, have invented certain new and useful Improvements in Moving-Picture Machines, of which the following is a specification.

The present invention relates generally to moving picture machines, and has more particularly reference to the mechanism which controls and moves the film.

In the prior art, as now practiced, the organization of the machine is such that the film has a simple uncompounded progressive motion only. This necessitates the arrangement of the pictures in a single row producing a long strip which has to be passed through the machine. This, in turn, makes it necessary to print each picture on the film separately from the negative produced by the camera. In consequence, the cost of these films is considerable.

The main object of this invention is the production of a machine which is capable of handling a film which has several rows of pictures, thereby obtaining a machine which is more compact and which admirably lends itself to use in homes, in the same manner that the ordinary phonograph is used. Such home use is also made possible by the fact that in the machine of the present invention a cheaper and more compact film can be employed.

With these and other objects in view, one feature of the invention comprises broadly a film holder which is capable of moving the film past the light aperture of the machine with a compound progressive and lateral shifting movement. The word "lateral" as here used does not refer to direction, but is used in a purely relative sense.

This invention may be embodied in many forms and is applicable both to the camera which takes the pictures and to the projector which exhibits them. The words "moving picture machine" as used herein is to be construed to include both a camera and a projector.

The compound movement of the film may be obtained by imparting to the film two curvilinear motions, eccentric with relation to each other, or it may be obtained by imparting two rectilinear motions to the film, at an angle to each other, or on converging lines with respect to each other. Or finally, it may be produced by one curvilinear and one rectilinear motion. In the preferred embodiment of the invention two curvilinear motions eccentric with relation to each other are employed, thereby causing the pictures to move in a spiral path with reference to the exposure opening of the machine. According to variations in structure, these two motions may be imparted simultaneously or alternately. Again one motion may be relatively constant, while the other is periodical with reference to the first motion.

In the preferred embodiment of the invention the film or film holder is given two simultaneous intermittent motions.

The word "film" as used herein means both the positive which is run through the projector, and the negative which is employed in the camera. The "film" may be either a flexible sensitized member or it may be a rigid sensitized plate made of glass, celluloid or other material.

The invention further consists in the combination of a film having a plurality of rows of pictures or sensitized area, together with means for successively bringing the individual pictures or sensitized area of the different rows into alinement with the exposure opening of the moving picture machine. In the case of the negative used in the camera, the sensitized area, before the pictures are taken, will naturally constitute a continuous sensitized surface, and the expression "sensitized area" or "pictures" should be so construed.

The rows of sensitized area of the film may be arranged in many ways. Thus, for instance, the rows may be arranged in rectilinear or curvilinear parallelism, or, as shown herein, the rows may be arranged to form a spiral.

Other features of construction will appear as the specification proceeds.

A concrete and preferred embodiment of the invention is illustrated in the accompanying drawings.

In the drawings: Figure 1 is a front elevation of a machine embodying my invention with the film broken away and indicated in dotted lines. Fig. 2 is a rear elevation of the same, the film in this case also being broken away. Fig. 3 is an end view of the machine, looking in the direction of the arrow 3 of Fig. 2. Fig. 4 is a detached detail view of the cam forming a part of the mechanism for imparting intermittent rotation to the film. Fig. 5 is a face view of the preferred form of film as designed for use with the machine illustrated. Fig. 6 is a broken detail view on an enlarged scale of the pawl and ratchet mechanism for imparting the intermittent progressive movement to the film. Fig. 7 is a plan view of the same, and, Fig. 8 is an end view thereof.

Similar characters of reference indicate corresponding parts in the several views.

10 indicates the film which is here shown in the form of a sensitized disk, provided with pictures or sensitized areas 12, arranged, in the present instance, in rows to form a spiral. The starting point of the pictures is indicated by the heavier circle 9.

11 indicates the exposure opening past which the pictures are successively brought. This disk 10 is mounted on the shaft 14, and held between the two clamping plates 15 and 16, the latter of which is removable, and fixed in position by means of the nut 17. The disk has a central aperture 8 which fits over the shaft 14, and is in addition provided with a registering hole 7 which, when alined with the stop 6, serves to position the disk properly in a circumferential direction. The disk is preferably made sufficiently stable to maintain its upright position unaided, but, if desired, a guide 5 may be provided, lined with velvet 4, for properly supporting the disk.

19 indicates a supporting arm carrying the shaft 14. This arm 19 is mounted on the pivot 20 so that the shaft 14, and, with it, the disk 10 can be moved laterally. In this instance it oscillates on the pivot 20.

Suitable means are provided for progressively rotating the disk 10. In the form here shown these means consist of a pawl 43 engaging the ratchet 44 mounted fast on the shaft 45. This shaft 45 carries a pinion 46 meshing with the gear 18 on the shaft 14. In this manner the shaft 14, and, with it, the disk 10 receives an intermittent progressive rotary motion.

Suitable means are provided for shifting the disk 10 laterally. In the present instance these means take the following form: Mounted on the pivot 21 on the arm 19, is a gear 22 which meshes with the gear 18. One face of the gear 22 is provided with a spiral cam or worm 23 with which engages the pin 24, which is relatively stationary and is mounted on the framework in the bracket 25. This pin is normally held in engagement with the spiral cam by means of the spring 26 and can be retracted from the spiral cam by means of the handle 27. Thus the rotation of the gear 18 rotates the spiral cam 23, and the latter by engaging with the stationary pin 24, will gradually shift the disk 10 laterally by turning the arm 19 around the center 20.

The means for operating the pawl and ratchet mechanism 43 and 44, may vary widely. According to this embodiment of the invention, it is constructed as follows: 28 indicates a driving shaft operated by the handle 13 or otherwise. This shaft carries a bevel gear 29, meshing with the bevel gear 30 on the shaft 31. The shaft 31 carries a large spur gear 32 which meshes with a pinion 33 on the shaft 34. The shaft 34 carries a cam 35 provided with a suitable cam groove 36 for the reception of the pin 37, carried by the block 38 mounted on the arm 39. This arm 39 is pivoted at 40, on the bracket 41. A self adjusting connection is interposed between the fixed driving train which progresses and laterally shifts the film. This connection is in the form of a long lever 42 which is hung loosely on the shaft 14, and which extends through the block 38. In this manner the cam 36 will give a vibration to the lever 42. On one end of this lever 42 is carried the shaft 45, ratchet 44, and pinion 46. Also fixed to this end of the lever 42 is the spring seated pawl 43. During the upward movements of the outer end of the arm 42 carrying the shaft 45, ratchet 44 and pinion 46, the gear wheel 18 is at rest and consequently at the same time the gear wheel 22, arm 19 and disk 10 are at rest also, these rest periods being the times for the exposures at the opening 11. During the downward movements of the outer end of the arm 42, the pawl 43 will prevent the ratchet 44 and pinion 46 from rotating and hence during such movements the pinion-wheel 46 being in rigid engagement with the gear-wheel 18 will, without itself rotating, cause said wheel to rotate and impart its movement to the disk 10 and gear wheel 22. As the lever 42 gradually slides through the sleeve 38, which represents the point at which power is applied to rock said arm on the shaft 14 as a fulcrum, the extent of said arm exposed between said sleeve and said shaft increases and hence the throw of the arm becomes less and the pinion wheel 46 has a gradually decreasing sweep, with the result that the step-by-step or intermittent rotations of the gear wheel 18 and disk 10 are gradually decreased in length the farther the carrying-arm 19 is turned laterally from its initial vertical position or in other words the farther the center of the disk 10 is carried from the vicinity of the exposure opening 11. The gradually decreasing throw of the lever-arm 42 and the consequent gradual decrease in the length of the intermittent rotations of the gear wheel 18 and disk 10 rotated therefrom, are essential in the present form of the invention because of the gradually enlarging spiral line of area on the disk 10 to be uniformly brought before the exposure opening 11. If an individual circle of equally spaced sensitized area on the disk 10 were to be brought before the opening 11, the disk would be given a uniform step-by-step rotary motion.

As convenient means for shielding the opening 11 during the movements of the disk 10, I provide the cam 35 with wings 50 to serve as shutters. It may or may not be necessary to use this shutter, since if the movement of the disk 10 is quick enough, the shutter may be dispensed with. When a positive disk 10 has been rotated and moved to effect the projection of all its pictures, it may be restored to its initial position instantly and again operated to repeat the exhibition. After one operation of the disk 10, the pin 24 may be withdrawn from the worm groove 23, and the arm 19 at once restored to its initial position.

The advantages of the present invention are manifold. One of the chief of these resides in the fact that a sensitized film disk can be placed in a camera having the film controlling construction disclosed herein and after the pictures are taken successively they may be printed in a single operation on a film to be used in a projector, instead of one at a time as heretofore. This film when inserted in a projector of the construction shown herein will then bear the pictures in the same order and relation and will register properly with the mechanism of the projector. Furthermore, the disks 10 are under no strain when in the machine and hence will last an indefinite length of time even with repeated use and they may be compactly stored or packed for shipment. The disks may bear a large number of pictures within limited space and hence are economical in the material used.

In order to prevent the light of the projector from setting fire to the film, I may provide the film with a light opening 60, at a point just preceding the first picture on the film. By means of this provision, the film may be placed in the projector and allowed to remain stationary therein, with the light turned on, all ready for use. If desired, also other light openings may be placed at the end of the series of pictures, or at points intermediate the ends.

What is claimed is:

1. The combination in a moving picture machine, of a film support, a member carried thereby provided with a spiral grooveway, means for operating said member to impart a lateral shifting movement to the film support, a film journaled on the support, and means for imparting an intermittent rotary motion to the film.

2. In a moving picture machine, a framework, a train of gearing in said framework, a rotatable film support mounted to swing laterally on a center outside of its axis of rotation, means for laterally shifting said film support by its rotation, and self-adjusting driving means for rotating said film support from the train of gears in the framework.

3. In a moving picture machine provided with an exposure opening, a rotatable film, means for intermittently rotating the film, means for shifting the film laterally with respect to the exposure opening, and a sliding connection between the rotating means and the shifting means.

4. In a moving picture machine provided with an exposure opening, a rotatable spindle for supporting the film, a cam, a member reciprocated thereby, a lever slidably connected with said member, mechanism carried by said lever engaging the spindle for imparting intermittent rotation thereto, and means for moving the spindle laterally with respect to the exposure opening.

5. In a moving picture machine, a spindle mounted to have a swinging movement, a cam, a sleeve member reciprocated by said cam, a lever engaged in said sleeve, and pawl and ratchet mechanism carried by said lever adapted to impart intermittent rotary movement to the spindle.

6. In a moving picture machine, a spindle mounted to have a swinging movement, a cam, a sleeve member reciprocated by said cam, a lever engaged in said sleeve, pawl and ratchet mechanism carried by said lever adapted to impart intermittent rotary movement to the spindle, and means for imparting a lateral swinging movement to the spindle.

7. In a moving picture machine, a film holder comprising a pivoted support and a spindle carried thereby, a gear on said spindle, a pinion engaging therewith, means actuating said pinion to impart intermittent rotary motion to the spindle, a gear on the support in mesh with the gear on the spindle and provided with a cam groove, and a relatively stationary member engaged in said cam groove.

8. In a moving picture machine, a support pivoted to the frame of the machine, a spindle carried thereby, a gear on said spindle, a lever mounted to rock on said spindle, a pinion journaled on said lever and meshing with said gear, a ratchet fixed to said pinion, a pawl on the lever engaging said ratchet, and means for reciprocating the aforesaid lever.

9. In a moving picture machine, a support pivoted to the frame of the machine, a spindle carried thereby, a gear on said spindle, a lever mounted to rock on said spindle, a pinion journaled on said lever and meshing with said gear, a ratchet fixed to said pinion, a pawl on the lever engaging said ratchet, means for reciprocating the aforesaid lever comprising a cam, and a sleeve having a part engaging said cam, and receiving the end of the lever.

10. In a moving picture machine, a support pivoted to the frame of the machine, a spindle carried thereby, a gear on said spindle, a lever mounted to rock on said spindle, a pinion journaled on said lever and meshing with said gear, a ratchet fixed to said pinion, a pawl on the lever engaging said ratchet, means for reciprocating the aforesaid lever comprising a cam, a sleeve having a part engaging said cam, and receiving the end of the lever, a gear carried by the support provided with a cam groove, and a member on the frame engaging said cam groove.

11. In a moving picture machine, driving gears, a cam operated thereby, a member reciprocated by said cam, a support and a spindle journaled thereon, a gear on said spindle, a lever engaged by the reciprocating member and a pinion carried by said lever in engagement with the gear on the spindle, a ratchet fixed to the pinion, a pawl engaging said ratchet, a gear on the support provided with a spiral groove-way, and a member on the frame engaging said groove-way.

12. In a moving picture machine provided with an exposure opening, a film support comprising a spindle having a movement toward and away from the exposure opening, a gear on said spindle, and means engaging said gear for imparting intermittent rotation to the spindle and the film mounted thereupon.

13. In a moving picture machine provided with an exposure opening, a film support comprising a spindle having a movement toward and away from the exposure opening, a gear on said spindle, means engaging said gear for imparting intermittent rotation to the spindle and the film mounted thereupon, and means for imparting a lateral shifting movement to the film support.

14. In a moving picture machine, a shiftable support and a spindle carried thereby, a gear on the spindle, means for imparting intermittent rotation to said gear, a cam on the support driven from said gear, and a relatively stationary member adapted to be engaged by said cam for imparting the shifting movement to the support.

Signed at New York in the county of New York and State of New York this 22nd day of October A. D. 1909.

GEORGE W. BINGHAM.

Witnesses:
PHILIP S. McLEAN,
TERESA V. LYNCH.